United States Patent
Mysore Nagendra Swamy et al.

(10) Patent No.: US 10,496,426 B1
(45) Date of Patent: Dec. 3, 2019

(54) VIRTUAL MACHINE CLUSTER FORMATION USING AVAILABLE INSTANCES

(71) Applicant: AMAZON TECHNOLOGIES, INC., Seattle, WA (US)

(72) Inventors: Naveen Mysore Nagendra Swamy, Campbell, CA (US); Madan Mohan Rao Jampani, Mountain View, CA (US); Alexander Johannes Smola, Sunnyvale, CA (US); Bhavin Thaker, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 15/608,750

(22) Filed: May 30, 2017

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45595* (2013.01)

(58) Field of Classification Search
CPC ....... G06F 9/45558; G06F 2009/45562; G06F 2009/4557; G06F 2009/45595
See application file for complete search history.

(56) References Cited

U.S. PATENT DOCUMENTS 9,647,889 B1 * 5/2017 Jones ...................... G06F 9/547
2017/0295082 A1 * 10/2017 Wu .......................... H04L 43/14

* cited by examiner

*Primary Examiner* — Sisley N Kim
(74) *Attorney, Agent, or Firm* — Lowenstein Sandler LLP (57) ABSTRACT

A cluster formation engine invokes generation of an automatically scalable group (ASG) of virtual machine instances, where the ASG is associated with one or more applications to be run in a cloud computing environment. The cluster formation engine detects a failure to generate a first virtual machine instance to be included in the ASG, and completes the generation of the ASG without including the first virtual machine instance in the ASG.

20 Claims, 7 Drawing Sheets

VIRTUAL MACHINE CLUSTER FORMATION USING AVAILABLE INSTANCES

BACKGROUND

Cloud computing is a type of Internet-based computing that provides a shared pool of configurable computing resources (e.g., computer networks, servers, storage devices, applications, etc.) to client systems and other devices on demand. Resources provided by cloud computing environments can be rapidly provisioned and released with minimal management effort. Applications developed for cloud computing environments may be configured to execute in clusters of multiple virtual machine instances to provide broader availability to a greater number of users at the same time. Conventionally, these clusters of instances may be created using a fixed size requested by the owner of the application. In many cases, if the requested number of instances cannot be generated during cluster formation, the generation process may take an extremely long period of time to complete or may fail to be created at all. Embodiments discussed herein provide technical solutions to problems introduced by these types of application deployments.

BRIEF DESCRIPTION OF THE DRAWINGS

The embodiments described herein will be understood more fully from the detailed description given below and from the accompanying drawings. The drawings should not be taken to limit the application to the specific embodiments, but are for explanation and understanding only.

DETAILED DESCRIPTION

Embodiments described herein relate to providing a platform for virtual machine cluster formation using the available instances in a cloud computing environment. In one embodiment, cluster formation engine can receive a request to create a cluster of instances for an application. In one embodiment, the cluster of instances may be generated as an automatically scalable group (ASG) of virtual machine instances associated with one or more applications to be executed in the could computing environment. In some embodiments, an ASG can include a collection of virtual machine instances that share similar characteristics and are treated as a logical grouping for the purposes of instance scaling and management. The cluster formation engine can receive a desired number of instances to generate to include in an ASG, and begin the process of generating the ASG instances until that number has been reached.

In conventional cloud computing systems, if the resources to generate an instance to be included in a cluster are not readily available, the process may wait until resources become available before completing the cluster. This can typically occur if the system does not have adequate memory or processing resources to generate a virtual machine to be included in the cluster. Additionally, in some cases a pool of virtual machine instances may be pre-generated and allocated to applications when requested. In this latter case, if there all pre-generated virtual machine instances have been allocated to existing applications, a new request may wait until an executing application returns a virtual machine to the pool. Thus, in many cases an application owner may experience significant delays when attempting to deploy an application. Additionally, in some cases, if a cluster fails to complete within a certain period of time, the entire cluster may be deconstructed, returning resources to the system so they may be used by other applications, without ever making any of the instances available for use, even if some instances had been successfully generated. When a cluster fails to complete, any allocated virtual machine instances may be returned to a pool of instances for allocation to another application. Alternatively, a generated virtual machine may be terminated so that the system resources may be used to generate a new instance for a different application request. In many cases an application owner may incur resource allocation costs for those instances that were generated successfully even though they were never made available for use.

In one embodiment, a cluster formation engine can remedy the above noted and other deficiencies by completing generation of an ASG associated with an application to be executed in a cloud computing environment even if the requested number of instances is not available. In one embodiment, if the cluster formation engine detects a failure to generate one of the instances to be included in the ASG, the ASG may be completed immediately rather than wait for additional resources to become available or fail due to a timeout condition. Thus, an application owner may be provided with an ASG that, while including fewer instances than requested, does not delay or abort the ASG generation.

Figure 1:
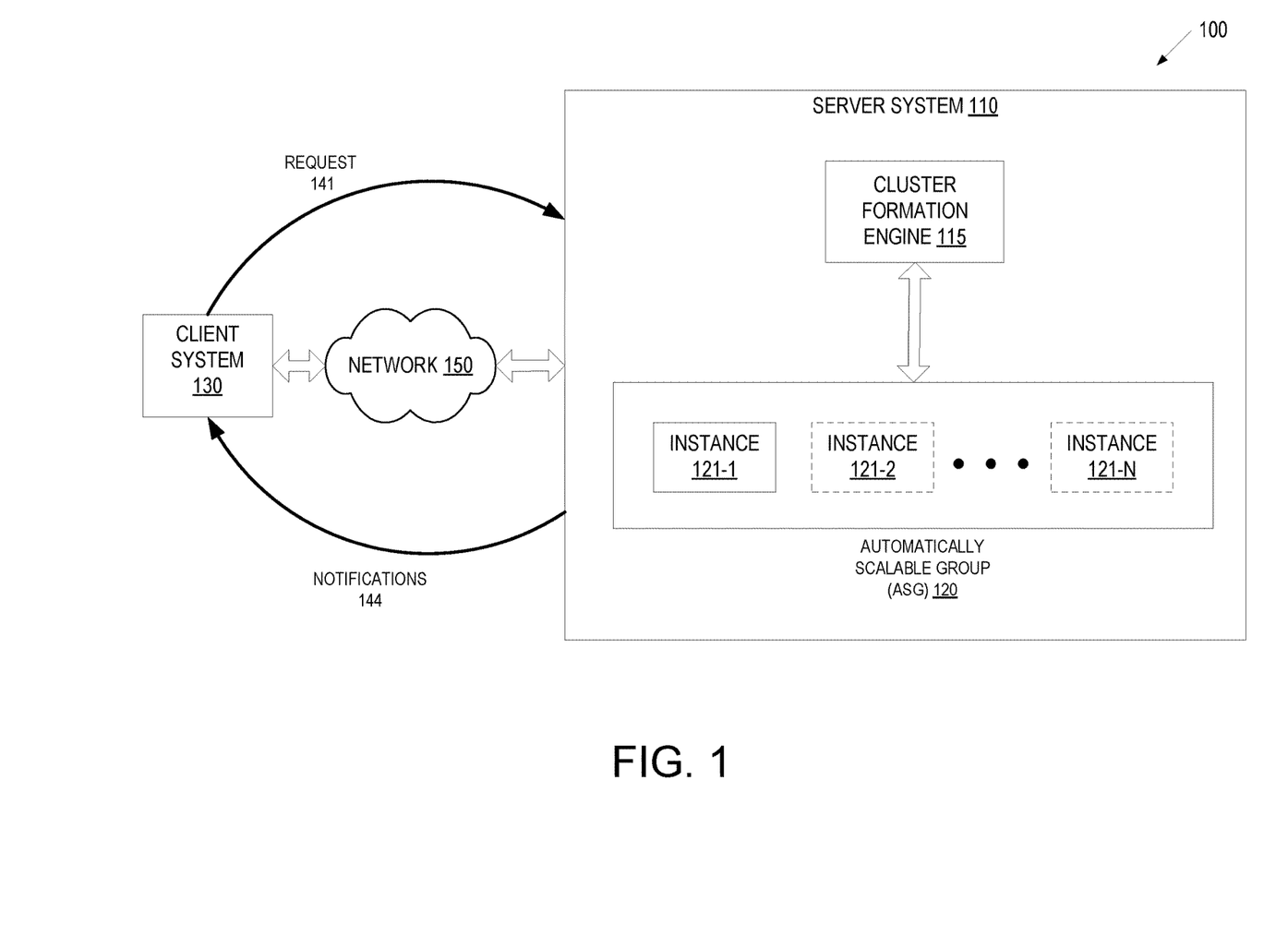
FIG. 1 is a block diagram of an example network architecture including cluster formation engine, in accordance with one embodiment.

FIG. 1 is a block diagram of an example network architecture 100 in which embodiments described herein may operate. In one embodiment, the network architecture 100 may include server system 110 and client system 130 capable of communicating with server system 110 via a network 120. In one embodiment, network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. In one embodiment, the network 120 may have any suitable communication range associated therewith and may include, for example, public networks (e.g., the Internet), metropolitan area networks (MANs), wide area networks (WANs), local area networks (LANs), or personal area networks (PANs). In one embodiment, the network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In one embodiment, client system 130 may include any type of mobile computing device (e.g., that has a finite power source) or traditionally non-portable computing device. In one embodiment, client system 130 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. In one embodiment, client system 130 may also be a traditionally non-portable computing device such as a desktop computer, a server computer, or the like. In one embodiment, device 130 may be configured with functionality to enable interaction a cluster formation engine, such as that provided by cluster formation engine 115 of server system 110.

In one embodiment, client system 130 may include access to an application development platform that can provide the ability configure an automatic scaling group (ASG) of virtual machine instances associated with one or more applications to be executed in a cloud computing environment within server system 110. In one embodiment, client system 130 may provide cluster formation engine 115 with configuration parameters for the ASG that control its creation and ongoing management. In some embodiments these configuration parameters may include settings such as a target number of instances for the ASG (e.g., a number of desired instances for the application), a maximum number of instances for the ASG (e.g., a number of instances that the ASG may be "scaled up to" during periods of high volume), or other similar information. In one embodiment, when client system 130 submits the ASG parameters to server system 110, cluster formation engine 115 may then invoke the generation of the ASG as described in further detail below.

Communication between the server system 120 and the client system 130 may be enabled via any communication infrastructure, such as public and private networks. In one embodiment, an example of such an infrastructure includes a combination of a wide area network (WAN) and wireless infrastructure, which allows a user to use client system 130 to interact with cluster formation engine 115 without being tethered to the server system 110 via hardwired links. In one embodiment, the wireless infrastructure may be provided by one or multiple wireless communications systems. In one embodiment, the wireless communication systems may be a Wi-Fi access point connected with the network 120. In one embodiment, the wireless communication systems may be a wireless carrier system that can be implemented using various data processing equipment, communication towers, etc. In one embodiment, the wireless carrier system may rely on satellite technology to exchange information with the client system 130.

In one embodiment, server system 110 may be set up by an entity such as a company or a public sector organization to provide one or more services (such as various types of cloud-based computing or storage) accessible via the Internet and/or other networks to client system 130. In one embodiment, server system 110 may include numerous data centers hosting various resource pools, such as collections of physical and/or virtualized computer servers, storage devices, networking equipment and the like, needed to implement and distribute the infrastructure and services offered by the server system 110, including to provide multi- and single-tenant services.

In one embodiment, server system 110 may implement a cluster formation engine 115 and associated services, provide other computing resources or services, such as a virtual compute service and storage services, such as object storage services, block-based storage services, data warehouse storage service, archive storage service, and/or any other type of network based services (which may include various other types of storage, processing, analysis, communication, event handling, visualization, and security services, such as a code execution service that executes code without client management of the execution resources and environment). In one embodiment, client system 130 may access these various services offered by server system 110 via network 120, for example through an application programing interface (API) or a command line interface (CLI) Likewise network-based services may themselves communicate and/or make use of one another to provide different services.

As noted above, in one embodiment, server system 110 may include a cluster formation engine 115 which can facilitate the configuration and generation of an automatically scalable group (ASG) 120 of virtual machine instances (instances 121-1 through 121-N) that is associated with one or more applications to be executed in a cloud computing environment of server system 110. In one embodiment, an application may be capable of executing in a cloud computing environment to provide services via a web browser, client application, mobile application, or the like. In various embodiments, the instances 121-1 through 121-N within ASG 120 may share similar characteristics and may be treated as a logical grouping for the purposes of instance scaling and management.

In one embodiment, cluster formation engine 115 may facilitate ASG formation using the available instance resources if sufficient resources to satisfy the configuration parameters specified by the client system 130 are not readily available. In one embodiment, cluster formation engine 115 can invoke generation of virtual machine instances for an ASG, and upon detecting that an instance has failed, complete the ASG without including any additional instances. Thus, in some embodiments, cluster formation engine 115 can provide a functional ASG for client system 130 with the instance resources available rather than abort ASG generation in the event that the resources were not available to support the requested number of instances.

In one embodiment, cluster formation engine 115 may receive a request 141 from client system 130 to generate an ASG, where the request includes a desired number of instances to include in the ASG. In one embodiment, cluster formation engine 115 may set the target number of instances for the ASG to be equal to the desired number specified in the request. In one embodiment, cluster formation engine 115 may invoke generation of the ASG by generating the target number of instances. In one embodiment, upon detecting a failure to generate one of the requested instances, cluster formation engine 115 may complete the generation of the ASG so that it includes the instances already generated (the available instances) without including any additional instances. In one embodiment, once the ASG has been completed, cluster formation engine 115 may send a notification 144 to client system 130 that indicates that the ASG has been generated with the available instances.

In one embodiment, cluster formation engine 115 may include an instance generator component responsible for instantiating a virtual machine instance for the application or associating an already instantiated instance with the application. In one embodiment, the instance generator may be responsible for allocating the resources necessary (e.g., virtual memory, virtual storage, virtual devices, virtual processors, etc.) to execute a virtual machine within server system 110. In one embodiment, once an instance is successfully created and available for execution, the instance generator component may continue to instantiate virtual machine instances until the target number of instances is obtained or a failure is detected. In one embodiment, the cluster formation engine 115 may detect the failure by receiving a notification from the instance generator that indicates that the generation of an instance failed.

In one embodiment, an ASG may be "completed" when either the target number of instances has been generated, or in the alternative, cluster formation engine 115 detects that generation of an instance has failed. In one embodiment, cluster formation engine 115 may complete the generation of the ASG by providing the successfully generated virtual machine instances to the client system 130 for use in executing the associated application within the cloud computing environment of server system 110. In one embodiment, this may include initiating execution of the application within each of the generated virtual machine instances, updating system configuration information to allow access to the application within the cloud computing environment of server system 110, or the like.

For example, in one embodiment, client system 130 may request an ASG 120 with a target number of 2 instances (e.g., instances 121-1 and 121-2). In one embodiment, cluster formation engine 115 may generate the first instance (121-1) for ASG 120 successfully. In one embodiment, while in the process of generating the second instance (121-2) for ASG 120, cluster formation engine 115 may detect a failure to generate the second instance. In one embodiment, a failure to generate the second instance may include a failure to launch the second instance within the cloud computing environment. In one embodiment, the failure to generate the second instance may include a failure obtain the necessary resources to create the instance. In various embodiments, a failure to generate an instance may be caused by lack of available resources to support the instance (e.g., lack of memory resources, lack of processor capacity, etc.). In one embodiment, the failure may occur immediately upon detecting insufficient resources to instantiate an instance. In one embodiment, the failure may occur if the instance generator component waits for resources for a period of time that exceeds a maximum wait time threshold. In some embodiments, upon detecting the failure to generate the second instance to be included in ASG 120, cluster formation engine 115 may complete the generation of ASG 120 without including the instance 121-2 in the ASG. Thus, ASG 120 may be completed with only a single instance (121-1) rather than the target number of 2 instances. Cluster formation engine 115 is described in further detail below with respect FIG. 2.

Figure 2:
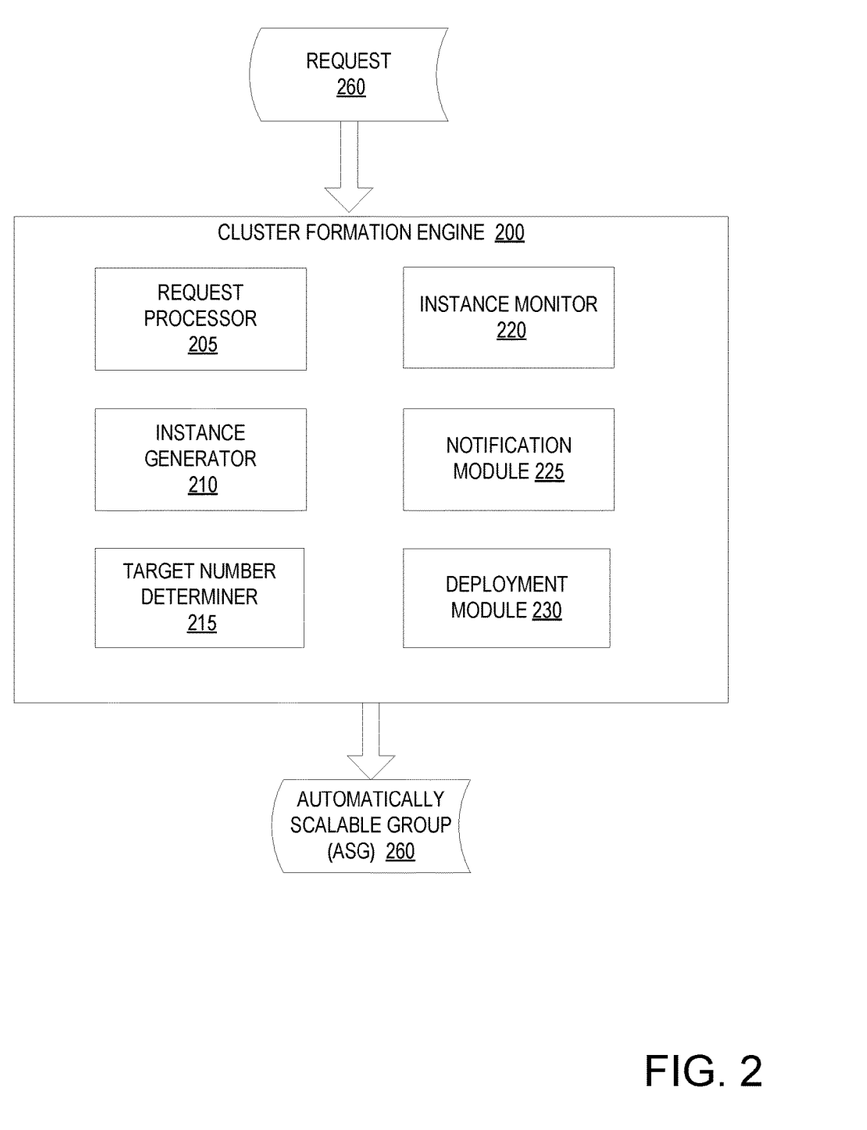
FIG. 2 is a block diagram of a logical view of cluster formation engine, in accordance with one embodiment.

FIG. 2 is a block diagram of a logical view of cluster formation engine 200, in accordance with one embodiment. In one embodiment, cluster formation engine 200 may correspond to the cluster formation engine 115 of FIG. 1. In one embodiment, cluster formation engine 200 may include request processor 205, instance generator 210, target number determiner 215, instance monitor 220, notification module 225, and deployment module 230.

In one embodiment, cluster formation engine 200 may facilitate the configuration and generation of an ASG when environment resources may be limited. Thus, in some embodiments, of virtual machine instances associated with an application to be executed in a cloud computing environment 200 may generate an ASG using the instances available, regardless of the number requested for the ASG. In one embodiment, request processor 205 can receive a request from a client system (e.g., client system 130 of FIG. 1) to generate an ASG of virtual machine instances associated with one or more applications to be executed in a cloud computing environment. In one embodiment, the request may include a number of instances representing the desired capacity of the ASG (e.g., the desired number of instances for the ASG).

In one embodiment, request processor 205 may invoke target number determiner 215 to set a target number of virtual machine instances it be included in the ASG to be equal to the desired number of instances received in the request. In some embodiments, target number determiner 215 may store the target number in a memory space accessible to cluster formation engine 200.

In one embodiment, cluster formation engine 200 may invoke generation of the ASG by executing instance generator 210. In one embodiment, instance generator 210 may be responsible for generating each of the instances for the ASG until the target number of instances has been obtained. In some embodiments, instance generator 210 may generate a virtual machine instance by allocating sufficient computing resources to allow the instance to execute the associated application. In some embodiments, this may include allocated virtual memory, virtual disk space, virtual processing capacity, or other similar resources. In some embodiments, instance generator 210 may successfully generate an instance when the resources needed for the instance are available. In some embodiments, instance generator 210 may fail to generate an instance to be included in the ASG if sufficient resources to create the instance are not available. In one embodiment, instance generator 210 may fail to generate an instance if the instance fails to successfully launch (e.g., sufficient run time resources are not available to support the launch, the instance abnormally terminates during the launch process, etc.)

In one embodiment, instance monitor 220 may be responsible for monitoring the progress of the ASG generation. In some embodiments, instance monitor 220 may restrict the generation of instances to be included in the ASG when resources are limited. In embodiments, once an instance is generated, instance generator 210 may send a notification to instance monitor 220 to indicate that an instance was successfully generated. In one embodiment, the notification may be sent using notification module 225. Instance monitor 220 may then update a currently available number of generated instances for the ASG (e.g., the number of generated instances currently available for use). In one embodiment, when instance monitor 220 detects that an instance has been successfully generated, it may determine an updated currently available number of generated instances by incrementing (adding one) to the currently available number. In some embodiments, the currently available number may be stored in a memory space accessible to cluster formation engine 200.

In some embodiments, instance generator 210 may be configured to execute continuously until the currently available number of generated instances reaches the target number of instances set by the initial request. Thus, in various embodiments, instance generator 210 may continue to generate additional virtual machine instances to be included in the ASG if it determines that the currently available number of generated instances is less than the target number of instances. In some embodiments, instance generator 210 may complete the ASG when the currently available number of generated instances is equal to the target number of instances.

In one embodiment, instance monitor 220 may additionally detect a failure to generate a virtual machine instance to be included in the ASG. In some embodiments, instance monitor 220 may detect the failure by receiving a notification from instance generator 210 that indicates that the generation of an instance failed. In one embodiment, once a failure of an instance has been detected, instance monitor 220 may cause instance generator 210 to complete the generation of the ASG with the currently available number of generated instances (rather than continue generating instances until the target number of instances have been generated). In one embodiment, instance monitor 220 may facilitate this by invoking target number determiner 215 to update the target number of instances.

In one embodiment target number determiner 215 may set the target number of instances to be equal to the currently available number of generated instances already included in the ASG. Thus, in some embodiments, since instance generator 210 may complete the generation of the ASG when the currently available number reaches the target number, the updated target number can cause the instance generator 210 complete the ASG without including any additional instances. In one embodiment, deployment module 230 may then be invoked to provide the completed ASG of virtual machine instances (ASG 260) for execution within the cloud computing environment.

As noted above, in some embodiments, instance generator 210 may be configured to execute continuously until the currently available number of generated instances reaches the target number of instances. In some embodiments, when instance generator 210 fails to generate an instance successfully, and after sending the notification to instance monitor 220, instance generator 210 may compare the currently available number of instances to the target number of instances before instance monitor 220 has set the target number to the currently available number as described above. In such embodiments, instance generator 210 may attempt to generate an additional instance in conformance with the process described above. In some embodiments, if the additional instance is generated successfully, a notification may be sent to the instance monitor 220 to indicate that the additional instance was generated. In such embodiments, instance monitor 220 may update the currently available number of generated instances accordingly. In some embodiments, instance monitor 220 may subsequently determine that the currently available number of instances has been updated such that it is now greater than the updated target number. Accordingly, instance monitor 220 may send a notification to instance generator 210 to terminate the additional instance so that the number of instances included in the ASG remains at the lowered target number of instances (e.g., the reduced number due to the detected failure).

In some embodiments, once the ASG has been provided for execution, instance monitor 220 may monitor the ASG for automatic scaling purposes during periods of high volume for the associated application. As noted above, in some embodiments the initial request can include a maximum number of instances to include in the ASG for future performance scaling. In such embodiments, the maximum number may be associated with the ASG and stored for monitoring purposes. The maximum number may be stored in a memory space, a data store, or in any other manner. In some embodiments, when request processor 205 sets the target number to be equal to the desired number of instances received in the request, the original desired number may additionally be stored with the maximum number.

In some embodiments, instance monitor 220 may detect that the ASG has encountered conditions to trigger an automatic scaling increase for the ASG. In some embodiments these conditions may include high volume for the associated application, poor response time of the currently executing instances, limited resources accessible by the currently executing instances, or the like. In some embodiments, instance generator 210 may be invoked to add additional instances to the ASG up to the maximum number of instances. In some embodiments, instance monitor 220 may first determine that the currently available number of generated instances is less than the desired number of instances received instances (e.g., as a result of the instance failure handling process described above). In such embodiments, Instance monitor 220 may then execute instance generator 210 to generate additional instances. Additionally, in some embodiments, instance monitor 220 may reset the target number of instances associated with the ASG to the original desired number of instances received in the request so that the ASG may be subsequently provided with the number of instances initially requested.

Figure 3:
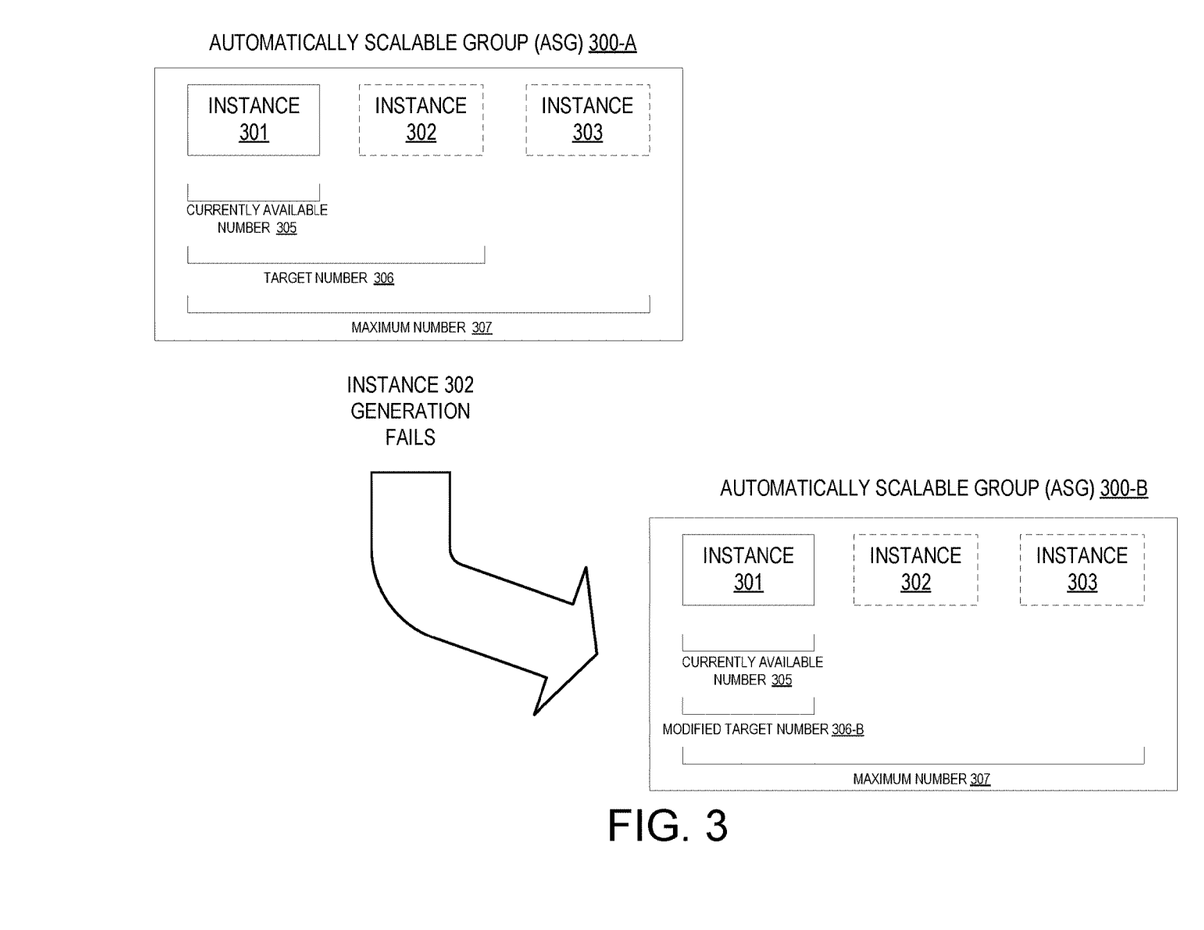
FIG. 3 illustrates an example of generating an automatically scalable group (ASG) using available virtual machine instances, in accordance with one embodiment.

FIG. 3 illustrates an example of generating an automatically scalable group (ASG) of instances. In one embodiment, an ASG 300-A may be initially configured based on information received in a request from a client system. As shown in FIG. 3, ASG 300-A is configured with a target number 306 of two instances, and a maximum number 307 of three instances. In one embodiment, the cluster formation engine described above with respect to FIGS. 1-2 may attempt to generate instances until it reaches the target number 306 or a failure occurs, resulting in a modification of the target number 306. In one embodiment, as shown in FIG. 3, the cluster formation engine has successfully generated instance 301, resulting in a currently available number 305 set to one instance.

In one embodiment, the cluster formation engine may detect a failure to generate instance 302 to be included in the ASG 300-A. In such cases, the cluster formation engine may execute the process described above to modify target number 306 to cause the instance generator to complete the ASG. In such embodiments, the cluster formation engine may modify the ASG as depicted by ASG 300-B. In these embodiments, target number 306 (initially set to two instances) may be modified (as depicted by modified target number 306-B) to be equal to the currently available number 306. Thus, modified target number 306-B may be set to one instance. In some embodiments, the instance generator of the cluster formation engine may complete the generation of the ASG since currently available number 305 and modified target number 306-B are now equal (both set to one instance).

Figure 4:
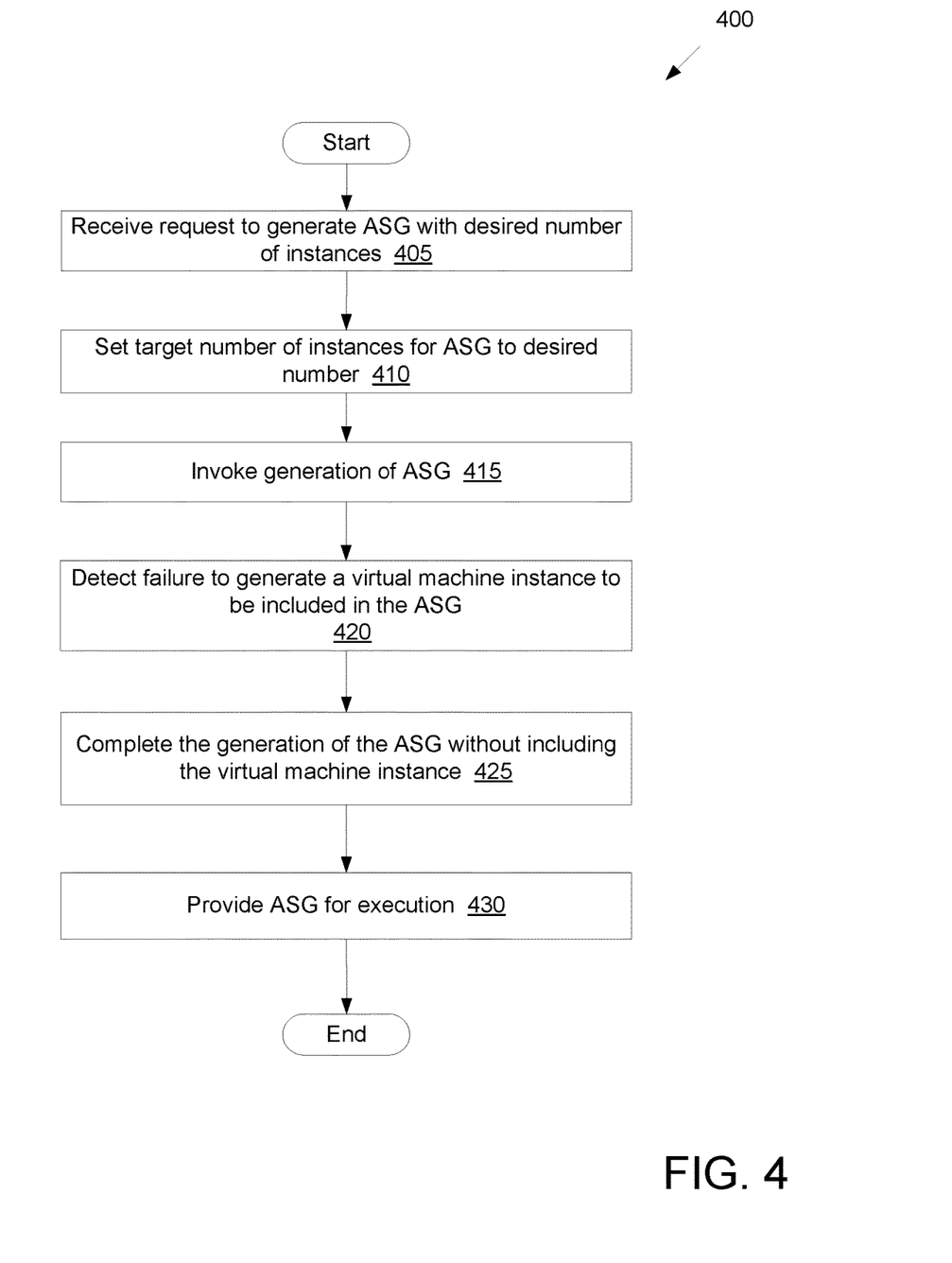
FIG. 4 is a flow diagram of an embodiment for a method of generating an ASG using available virtual machine instances, in accordance with one embodiment.
Figure 5:
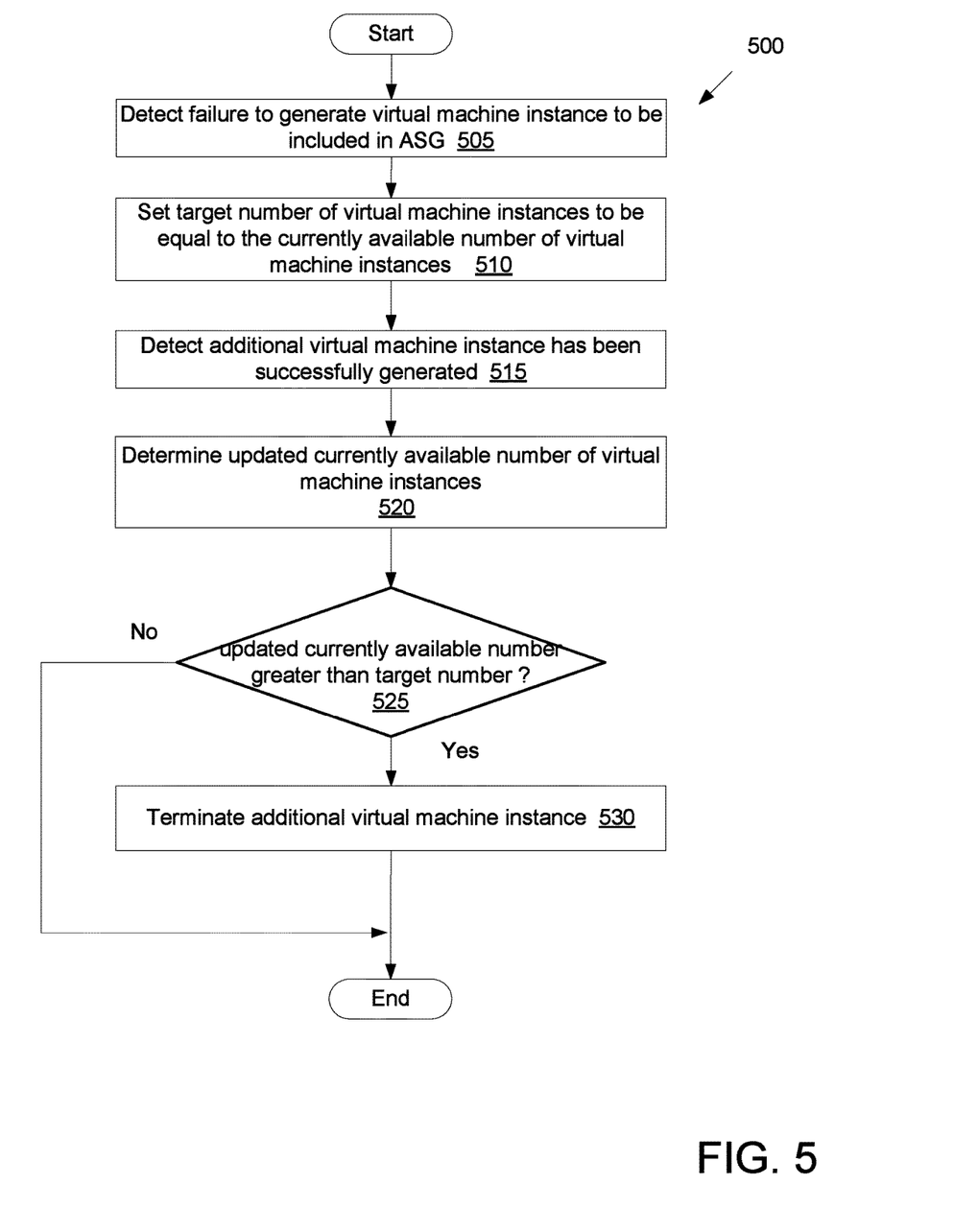
FIG. 5 is a flow diagram of an embodiment for a method of maintaining an ASG, in accordance with one embodiment.
Figure 6:
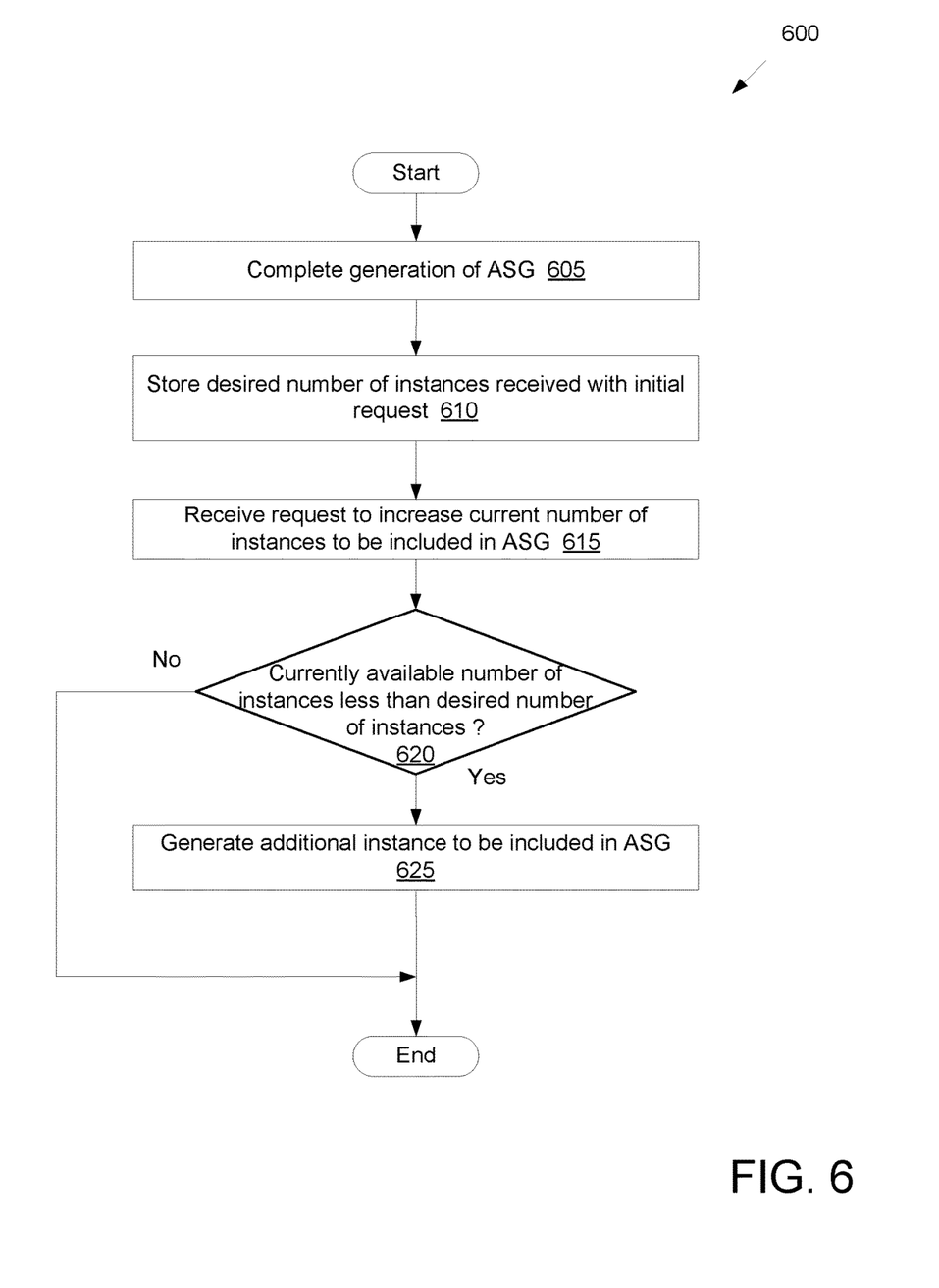
FIG. 6 is a flow diagram of an embodiment for a method of increasing the instances in an ASG, in accordance with one embodiment.

FIGS. 4-6 are flow diagrams of various embodiments of methods performed by a cluster formation engine to generate an automatically scalable group of instances when instance resources are limited. The methods are performed by processing logic that may include hardware (circuitry, dedicated logic, etc.), software (such as is run on a general purpose computer system or a dedicated machine), firmware, or some combination thereof. In one embodiment, the methods may be performed by cluster formation engine 115 of FIG. 1, and/or cluster formation engine 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 is a flow diagram of an embodiment for a method 400 of generating an automatically scalable group (ASG) using available virtual machine instances. At block 405 of method 400, processing logic receives a request to generate an automatically scalable group (ASG) of virtual machine instances. In one embodiment, the ASG is associated with one or more applications to be run in a cloud computing environment. In one embodiment, the request includes a desired number of virtual machine instances to generate for the ASG of virtual machine instances (e.g., a number of instances desired by the requestor). At block 410, processing logic sets a target number of instances for the ASG to be equal to the desired number received in the request at block 405. At block 415, processing logic invokes generation of the ASG. In one embodiment, processing logic invokes generation of the ASG by causing an instance generator component of the cloud computing environment to generate a virtual machine instance to be included in the ASG.

At block 420, processing logic detects a failure to generate a virtual machine instance to be included in the ASG. In one embodiment, a failure to generate the virtual machine instance may include a failure to launch the virtual machine instance within the cloud computing environment. In one embodiment, the failure to generate the virtual machine instance may include a failure obtain the necessary resources to create the virtual machine instance. In various embodiments, a failure to generate an instance may be caused by lack of available resources to support the instance (e.g., lack of memory resources, lack of processor capacity, etc.). In one embodiment, the failure may occur immediately upon detecting insufficient resources to instantiate an instance. In one embodiment, the failure may occur if an instance generator component waits for resources for a period of time that exceeds a maximum wait time threshold. In one embodiment, processing logic detects the failure by receiving a notification from the instance generator that indicates that generation of the instance failed.

At block 425, processing logic completes the generation of the ASG without including the virtual machine instance. In one embodiment, processing logic completes the generation of the ASG by setting the target number of virtual machine instances to be equal to the currently available number of generated virtual machine instances. In one embodiment, upon detecting that the target number is equal to the currently available number, processing logic causes the instance generator component to complete the ASG. At block 430, processing logic provides the ASG for execution within the cloud computing environment. After block 430, the method of FIG. 4 terminates.

FIG. 5 is a flow diagram of an embodiment for a method 500 of maintaining an ASG. At block 505 of method 500, processing logic detects a failure to generate a virtual machine instance to be included in an ASG. At block 510, processing logic sets the target number of virtual machine instances to be equal to the currently available number of generated virtual machine instances included in the ASG. At block 515, processing logic detects that an additional virtual machine instance has been successfully generated. At block 520, processing logic determines an updated currently available number of generated virtual machine instances. At block 525, processing logic determines whether the updated currently available number is greater than the target number. If processing logic determines that the updated currently available number is greater than the target number, processing proceeds to block 530. Otherwise, the method of FIG. 5 terminates. At block 530, processing logic terminates the additional virtual machine instance detected at block 515. After block 530, the method of FIG. 5 terminates.

FIG. 6 is a flow diagram of an embodiment for a method 600 of increasing the instances in an ASG. At block 605 of method 600, processing logic completes the generation of an ASG. In one embodiment, the ASG is completed as described above with respect to method 400 of FIG. 4. At block 610, processing logic stores a desired number of instances received in the initial request to generate the ASG. At block 615, processing logic receives a request to increase the currently available number of instances included in the ASG. In one embodiment, the request may be received in response to environmental conditions that indicate that the ASG is to be automatically scaled up to increase its number of instances. For example, the application associated with the ASG may be experiencing high volumes and as a result may require additional resources. At block 620, processing logic determines whether the currently available number of instances is less than the desired number of instances received in the initial request. In one embodiment, this may occur as a result of an ASG that was completed after an instance failed to generate successfully. If the currently available number of instances is less than the desired number of instances, processing continues to block 625. Otherwise, the method of FIG. 6 terminates. At block 625, processing logic generates an additional instance to be included in the ASG. After block 625, the method of FIG. 6 terminates.

Figure 7:
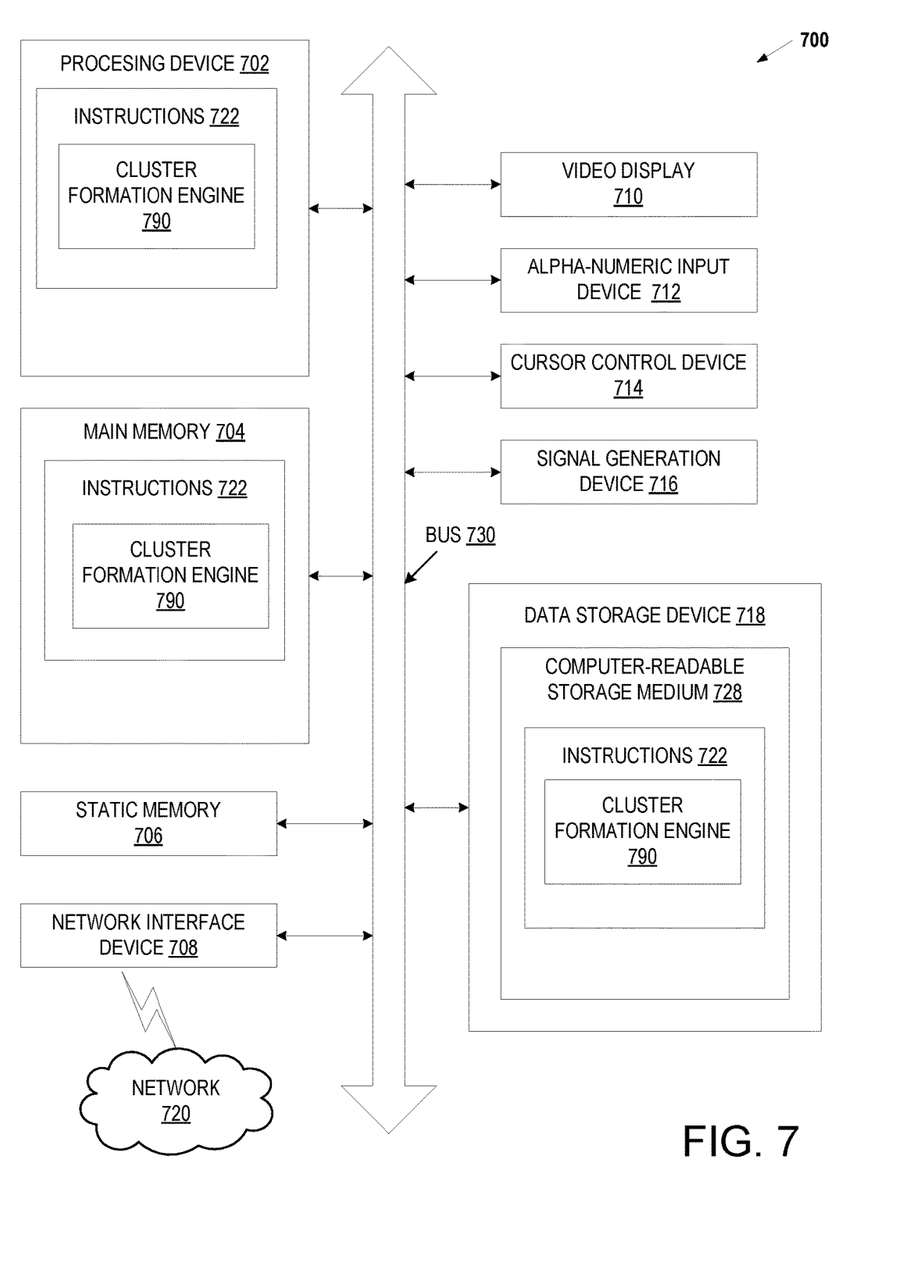
FIG. 7 is a block diagram illustrating a server computing device with an asynchronous dependency resolver, in accordance with one embodiment.

FIG. 7 is a block diagram illustrating a computing device 700 with a cluster formation engine 790, in accordance with one embodiment. In one embodiment, the server computing device 700 may be connected (e.g., networked) to other machines in a LAN, an intranet, an extranet, and/or the Internet. In one embodiment, the server computing device 700 may be a personal computer (PC), a tablet PC, a set-top box (STB), a web appliance, a rackmount server, a network router, a switch or bridge, or any machine capable of executing a set of instructions (sequential or otherwise) that specify actions to be taken by that machine. Further, while a single machine is illustrated, in one embodiment the server computing device 700 shall also be taken to include any collection of machines that individually or jointly execute a set (or multiple sets) of instructions to perform any one or more of the methodologies discussed herein. For example, the server computing device 700 may be one or more devices in a server system. In one embodiment, the server computing device 700 is one node of a cluster that provides a cloud service such as Amazon's® elastic compute cloud (EC2®), Amazon web services (AWS®), or other cloud service.

In one embodiment, the server computing device 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage component 718, which communicate with each other via a bus 830.

In one embodiment, processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. In one embodiment, processing device 702 may also be one or more special-purpose processing devices such as an application specific integrated circuit (ASIC), a field programmable gate array (FPGA), a digital signal processor (DSP), network processor, or the like. In one embodiment, the processing device 702 is configured to execute instructions 722 for performing the operations and steps discussed herein.

In one embodiment, the server computing device 700 may further include a network interface device 708. In one embodiment, the server computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and/or a signal generation device 716 (e.g., a speaker).

In one embodiment, the data storage component 718 may include a machine-readable storage medium 728 (also known as a computer-readable medium) on which is stored one or more sets of instructions or software 722 embodying any one or more of the methodologies or functions described herein. In one embodiment, the instructions 722 may also reside, completely or at least partially, within the main memory 704 and/or within the processing device 702 during execution thereof by the server computing device 700, the main memory 704 and the processing device 702 also constituting machine-readable storage media.

In one embodiment, the instructions 722 include instructions for cluster formation engine 790 (e.g., cluster formation engine 115 of FIG. 1, and/or cluster formation engine 200 of FIG. 2) and/or a software library containing methods that call modules in an contact run-time engine (e.g., corresponding to the methods of FIGS. 4-6, etc.). In one embodiment, while the machine-readable storage medium 728 is shown to be a single medium, the term "machine-readable storage medium" should be taken to include a single medium or multiple media (e.g., network attached storage, a centralized or distributed database, and/or associated unsolicited content storage areas and servers) that store the one or more sets of instructions. In one embodiment, the term "machine-readable storage medium" shall also be taken to include any medium other than a carrier wave that is capable of storing or encoding a set of instructions for execution by the machine and that cause the machine to perform any one or more of the methodologies of the present disclosure. In one embodiment, the term "machine-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "setting", "generating", "determining", "invoking", "detecting", "providing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention relate to an apparatus for performing the operations herein. This apparatus may be specially constructed for the disclosed purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The structure for a variety of these systems will appear from the description above. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a request to generate an automatically scalable group (ASG) of virtual machine instances, wherein the ASG is associated with one or more applications to be run in a cloud computing environment, wherein the request comprises a requested number of virtual machine instances to generate for the ASG of virtual machine instances;
setting a target number of virtual machine instances to be included in the ASG to be equal to the requested number of virtual machine instances;
invoking generation of the ASG by causing an instance generator component of the cloud computing environment to generate a first virtual machine instance to be included in the ASG of virtual machine instances;
detecting a failure to generate the first virtual machine instance to be included in the ASG;
in response to detecting the failure to generate the first virtual machine instance, setting the target number of virtual machine instances to be equal to a currently available number of generated virtual machine instances, wherein the currently available number of generated virtual machine instances is lower than the requested number of virtual machine instances;
causing the instance generator component to complete the generation of the ASG with the currently available number of generated virtual machine instances rather than the requested number of virtual machine instances, wherein the ASG does not include the first virtual machine instance; and
providing the ASG of virtual machine instances for execution within the cloud computing environment.

2. The method of claim 1, further comprising:
detecting that a second virtual machine instance has been successfully generated;
determining an updated currently available number of generated virtual machine instances by adding one to the currently available number of generated virtual machine instances; and
responsive to determining that the updated currently available number is greater than the target number, causing the instance generator component to terminate the second virtual machine instance.

3. The method of claim 1, wherein the generation of the ASG is completed at a first time, the method further comprising:
storing the requested number associated with the ASG of virtual machine instances;
receiving, at a second time that occurs after the first time, a request to increase the currently available number of generated virtual machine instances to be included in the ASG of virtual machine instances;
determining that the currently available number of generated virtual machine instances is less than the requested number of virtual machine instances; and
causing the instance generator component of the cloud computing environment to generate an additional virtual machine instance to be included in the ASG of virtual machine instances.

4. A method comprising:
invoking generation of an automatically scalable group (ASG) of virtual machine instances, wherein the ASG is associated with one or more applications to be run in a cloud computing environment;
detecting a failure to generate a first virtual machine instance to be included in the ASG;
in response to detecting the failure to generate the first virtual machine instance, setting a target number of virtual machine instances to be included in the ASG to be equal to a currently available number of generated virtual machine instances, wherein the currently available number of generated instances is lower than a requested number of virtual machine instances; and
completing the generation of the ASG with the currently available number of generated virtual machine instances rather than the requested number of virtual machine instances, wherein the ASG does not include the first virtual machine instance.

5. The method of claim 4, further comprising:
receiving a request to generate the ASG of virtual machine instances, wherein the request comprises the requested number of virtual machine instances to generate for the ASG of virtual machine instances.

6. The method of claim 5, further comprising:
setting the target number of virtual machine instances to include in the ASG to be equal to the requested number.

7. The method of claim 4, wherein invoking generation of the ASG of virtual machine instances comprises causing an instance generator component of the cloud computing environment to generate the first virtual machine instance of the ASG of virtual machine instances.

8. The method of claim 6, further comprising:
determining the currently available number of generated virtual machine instances included in the ASG;
determining whether the currently available number of generated virtual machine instances is less than the target number of virtual machine instances for the ASG; and
responsive to determining that that currently available number of generated virtual machine instances is less than the target number of virtual machine instances, causing an instance generator component of the cloud computing environment to generate an additional virtual machine instance to be included the ASG.

9. The method of claim 6, wherein detecting the failure to generate the first virtual machine instance to be included in the ASG comprises receiving a notification from an instance generator component of the cloud computing environment that indicates that generation of the first virtual machine instance failed.

10. The method of claim 9, further comprising:
responsive to receiving the notification:
determining the currently available number of generated virtual machine instances for the ASG; and
setting the target number of virtual machine instances to be equal to the currently available number of virtual machine instances to cause the instance generator component to complete the generation of the ASG without including the first virtual machine instance in the ASG.

11. The method of claim 6, further comprising:
detecting that a second virtual machine instance has been successfully generated for the ASG;
determining an updated currently available number of generated virtual machine instances by adding one to the currently available number of generated virtual machine instances; and
responsive to determining that the updated currently available number is greater than the target number, causing an instance generator component to terminate the second virtual machine instance.

12. The method of claim 5, wherein the generation of the ASG is completed at a first time, the method further comprising:
   storing the requested number associated with the ASG of virtual machine instances;
   receiving, at a second time that occurs after the first time, a request to increase a currently available number of generated virtual machine instances to be included in the ASG of virtual machine instances;
   determining that the currently available number of generated virtual machine instances is less than the requested number of virtual machine instances; and
   causing an instance generator component of the cloud computing environment to generate an additional virtual machine instance to be included in the ASG of virtual machine instances.

13. A system comprising:
   a processing device; and
   memory to store computer-executable instructions that, if executed, cause the processing device to:
      invoke generation of an automatically scalable group (ASG) of virtual machine instances, wherein the ASG is associated with one or more applications to be run in a cloud computing environment;
      detect a failure to generate a first virtual machine instance to be included in the ASG;
      in response to detecting the failure to generate the first virtual machine instance, set a target number of virtual machine instances to be included in the ASG to be equal to a currently available number of generated virtual machine instances, wherein the currently available number of generated instances is lower than a requested number of virtual machine instances; and
      complete the generation of the ASG with the currently available number of generated virtual machine instances rather than the requested number of virtual machine instances, wherein the ASG does not include the first virtual machine instance.

14. The system of claim 13, wherein the processing device is further to:
   receive a request to generate the ASG of virtual machine instances, wherein the request comprises the requested number of virtual machine instances to generate for the ASG of virtual machine instances; and
   set the target number of virtual machine instances to include in the ASG to be equal to the requested number.

15. The system of claim 14, wherein the processing device is further to:
   determine the currently available number of generated virtual machine instances included the ASG;
   determine whether the currently available number of generated virtual machine instances is less than the target number of virtual machine instances for the ASG; and
   responsive to determining that that currently available number of generated virtual machine instances is less than the target number of virtual machine instances, cause an instance generator component of the cloud computing environment to generate an additional virtual machine instance to be included in the ASG.

16. The system of claim 14, wherein to detect the failure to generate the first virtual machine instance to be included in the ASG, the processing device is to:
   receive a notification from an instance generator component of the cloud computing environment that indicates that generation of the first virtual machine instance failed.

17. The system of claim 16, wherein the processing device is further to:
   responsive to receiving the notification:
      determine the currently available number of generated virtual machine instances for the ASG; and
      set the target number of virtual machine instances to be equal to the currently available number of virtual machine instances to cause the instance generator component to complete the generation of the ASG without including the first virtual machine instance in the ASG.

18. The system of claim 14, wherein the processing device is further to:
   detect that a second virtual machine instance has been successfully generated for the ASG;
   determine an updated currently available number of generated virtual machine instances by adding one to the currently available number of generated virtual machine instances; and
   responsive to determining that the updated currently available number is greater than the target number, cause an instance generator component to terminate the second virtual machine instance.

19. The system of claim 18, wherein to detect that the second virtual machine instance has been successfully generated, the processing device is further to:
   receive a notification from an instance generator component of the cloud computing environment that indicates that generation of the second virtual machine instance was successful.

20. The system of claim 14, wherein the generation of the ASG is completed at a first time, and wherein the processing device is further to:
   store the requested number associated with the ASG of virtual machine instances;
   receive, at a second time that occurs after the first time, a request to increase a currently available number of generated virtual machine instances to be included in the ASG of virtual machine instances;
   determine that the currently available number of generated virtual machine instances is less than the requested number of virtual machine instances; and
   cause an instance generator component of the cloud computing environment to generate a an additional virtual machine instance to be included in the ASG of virtual machine instances.

* * * * *